United States Patent
Jiao et al.

(10) Patent No.: US 10,093,288 B2
(45) Date of Patent: Oct. 9, 2018

(54) MULTI-WHEEL AEROPLANE BRAKING SYSTEM BASED ON SELF-ENERGY-REGENERATIVE BRAKING DEVICE AND CONTROLLING METHOD THEREFOR

(71) Applicant: BEIHANG UNIVERSITY, Beijing (CN)

(72) Inventors: Zongxia Jiao, Beijing (CN); Xiaochao Liu, Beijing (CN); Yaoxing Shang, Beijing (CN); Cheng Huang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 128 days.

(21) Appl. No.: 15/111,129

(22) PCT Filed: Jul. 14, 2014

(86) PCT No.: PCT/CN2014/082137
§ 371 (c)(1),
(2) Date: Jul. 12, 2016

(87) PCT Pub. No.: WO2015/109779
PCT Pub. Date: Jul. 30, 2015

(65) Prior Publication Data
US 2016/0347290 A1    Dec. 1, 2016

(30) Foreign Application Priority Data

Jan. 26, 2014   (CN) .......................... 2014 1 0038142

(51) Int. Cl.
*B60T 1/10* (2006.01)
*B64C 25/44* (2006.01)
(Continued)

(52) U.S. Cl.
CPC .............. *B60T 1/10* (2013.01); *B60T 8/1703* (2013.01); *B64C 25/44* (2013.01); *F16D 61/00* (2013.01); *B60T 2270/604* (2013.01)

(58) Field of Classification Search
CPC .... B60T 8/1703; B60T 2270/604; B60T 1/10; B64C 25/44
See application file for complete search history.

(56) References Cited

U.S. PATENT DOCUMENTS 3,881,732 A   5/1975   Benjamin
5,042,750 A   8/1991   Winter
(Continued)

FOREIGN PATENT DOCUMENTS

CN   2928880 Y    8/2007
CN   102092472 A  6/2011
(Continued)

OTHER PUBLICATIONS

International Search Report of PCT/CN2014/082137.

*Primary Examiner* — Vishal R Sahni
(74) *Attorney, Agent, or Firm* — Kilpatrick Townsend & Stockton, LLP

(57) ABSTRACT

Disclosed are a multi-wheel aeroplane braking system based on a self-energy-regenerative braking device and a controlling method therefor. The multi-wheel aeroplane braking system based on a self-energy-regenerative braking device can comprise a controller, a self-energy-regenerative braking device assembly, hydraulic pumps, and sets of braking actuators. The controller is connected to the self-energy-regenerative braking device assembly for sending a braking instruction thereto. The hydraulic pumps are respectively connected to the self-energy-regenerative braking device assembly for feeding a high pressure oil thereto under the driving motion of the aeroplane wheels. The self-energy-regenerative braking device assembly is configured to receive at least part of the high-pressure oil fed by the (Continued)

hydraulic pumps and the braking instruction sent by the controller and feeding the high pressure oil to each of the braking actuators according to the braking instruction. The barking actuators are respectively connected to the self-energy-regenerative braking device assembly.

10 Claims, 6 Drawing Sheets

(51) Int. Cl.
    *B60T 8/17*    (2006.01)
    *F16D 61/00*    (2006.01)

(56) References Cited

U.S. PATENT DOCUMENTS

| | | | | |
|---|---|---|---|---|
| 2006/0137927 A1* | 6/2006 | Fleming | ............ | B60K 6/48 |
| | | | | 180/165 |
| 2011/0066345 A1* | 3/2011 | Nasu | ............ | B60L 7/24 |
| | | | | 701/70 |
| 2011/0303785 A1 | 12/2011 | Delloue et al. | | |
| 2014/0131150 A1* | 5/2014 | Nimura | ............ | B60L 1/003 |
| | | | | 188/158 |
| 2015/0123456 A1* | 5/2015 | Sato | ............ | B60T 8/267 |
| | | | | 303/3 |
| 2016/0096434 A1* | 4/2016 | Nakaoka | ............ | B60L 3/102 |
| | | | | 701/78 |

FOREIGN PATENT DOCUMENTS

| | | |
|---|---|---|
| CN | 203111499 U | 11/2011 |
| CN | 202244077 U | 5/2012 |
| CN | 102991491 A | 3/2013 |
| CN | 103786877 A | 5/2014 |
| CN | 103803063 A | 5/2014 |
| EP | 1205369 A1 | 5/2002 |

\* cited by examiner

US 10,093,288 B2

MULTI-WHEEL AEROPLANE BRAKING SYSTEM BASED ON SELF-ENERGY-REGENERATIVE BRAKING DEVICE AND CONTROLLING METHOD THEREFOR

The present application claims priority of Chinese patent application No. CN201410038142.7, entitled "multi-wheel aeroplane braking system based on self-energy-regenerative braking device and controlling method thereof".

FIELD OF THE INVENTION

The present invention relates to the technical field of aeroplane braking systems, and particularly relates to a multi-wheel aeroplane braking system based on a self-energy-regenerative braking device and a controlling method thereof.

BACKGROUND OF THE INVENTION

An aeroplane braking system is an important system for guaranteeing the safety of an aeroplane. It is mainly configured to dissipate kinetic energy when the aeroplane skates on the ground, ensuring aeroplane braking stop, shortening the skating distance of the aeroplane and preventing excessive wear of aeroplane wheels, can cooperate with other onboard systems to achieve turning and parking functions of the aeroplane, is an important system for guaranteeing safe take-off and landing of the aeroplane, and is an important constituent part of a modern aeroplane.

Whether the aeroplane braking system is safe and reliable or not is directly related to whether the aeroplane is safe and reliable or not overall, the aeroplane braking system at present mostly adopts a hydraulic braking system, but the hydraulic braking system needs to depend on the energy of the aeroplane engine and has the problems of leakage, pipeline vibration, heavy hydraulic pipelines and the like.

SUMMARY OF THE INVENTION

A brief summary on the present invention is given below, so as to provide basic understanding on some aspects of the present invention. It should be understood that the summary is not an exhaustible one on the present invention. It does not intend to determine the key or important part of the present invention or limit the scope of the present invention. It only aims to give some concepts in a simplified form, and thus serves as the preface of more detailed description below.

The present invention provides a multi-wheel aeroplane braking system based on a self-energy-regenerative braking device and a controlling method thereof to improve the reliability of the multi-wheel aeroplane braking system.

The present invention provides a multi-wheel aeroplane braking system based on a self-energy-regenerative braking device, including a controller, a self-energy-regenerative braking device assembly, a plurality of hydraulic pumps and a plurality of braking actuators. The controller is connected to the self-energy-regenerative braking device assembly, and is configured to send a braking instruction to the self-energy-regenerative braking device assembly. The hydraulic pumps are respectively connected to the self-energy-regenerative braking device assembly, one aeroplane wheel is correspondingly connected with one hydraulic pump, and the hydraulic pumps are configured to feed high-pressure oil to the self-energy-regenerative braking device assembly under the driving by the motion of the aeroplane wheels connected thereto. The self-energy-regenerative braking device assembly is connected with the controller, the hydraulic pumps and the braking actuators respectively, and is configured to receive the high-pressure oil fed by at least part of the hydraulic pumps and the braking instruction sent by the controller and feeding the high-pressure oil to each of the braking actuators according to the braking instruction. The braking actuators are respectively connected to the self-energy-regenerative braking device assembly, one aeroplane wheel is correspondingly connected with one braking actuator, and the braking actuators are configured to receive the high-pressure oil fed by the self-energy-regenerative braking device assembly and braking the correspondingly connected aeroplane wheels.

The present disclosure further provides a controlling method of a multi-wheel aeroplane braking system based on a self-energy-regenerative braking device, including:

feeding, by a plurality of hydraulic pumps, high-pressure oil to a self-energy-regenerative braking device assembly under the driving by the motion of aeroplane wheels connected with the hydraulic pumps;

sending a braking instruction to the self-energy-regenerative braking device assembly by a controller;

receiving the high-pressure oil fed by at least part of the hydraulic pumps and the braking instruction sent by the controller and feeding the high-pressure oil to each of the braking actuators according to the braking instruction by the self-energy-regenerative braking device assembly; and receiving the high-pressure oil fed by the self-energy-regenerative braking device assembly and braking the correspondingly connected aeroplane wheels by the braking actuators.

Compared with the prior art, the present invention has the following advantages: according to the multi-wheel aeroplane braking system based on a self-energy-regenerative braking device provided by the present invention, the kinetic energy, when the aeroplane wheels skates on the ground, can be converted into hydraulic energy by the hydraulic pumps, to provide high-pressure oil for the braking actuators to achieve braking, so that the energy of the aeroplane engine is not relied on, the weight of the aeroplane is reduced and the reliability of the aeroplane braking system is improved.

BRIEF DESCRIPTION OF THE DRAWINGS

The present invention can be better understood by referring to the following description given below in combination with the accompanying drawings, in which the same or similar components are represented by the same or similar signs throughout the drawings. The drawings, along with the following detailed description, are included in the specification, constitute part of the specification, and are configured to further illustrate preferred embodiments of the present invention and interpret the principle and advantages of the present invention by examples. In the drawings.

Figure 1:
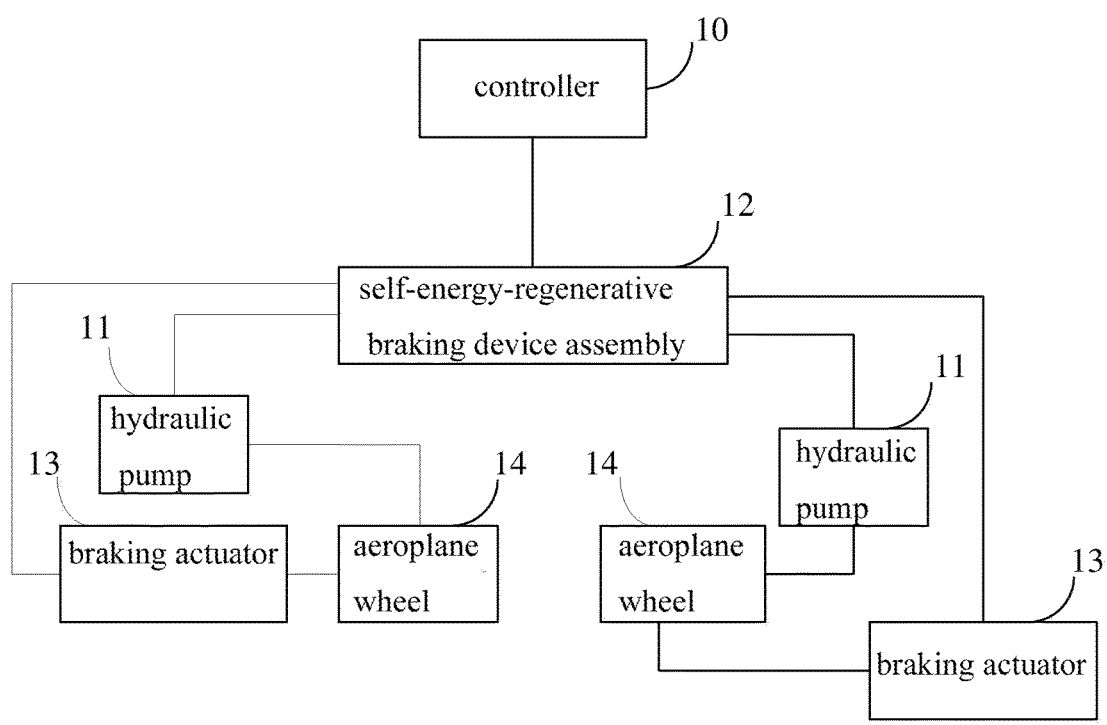
FIG. 1 is a structural block diagram of a multi-wheel aeroplane braking system based on a self-energy-regenerative braking device provided by an embodiment in accordance with the disclosure.

It should be understood by those skilled in the art that the elements in the drawings are merely shown for the sake of simplicity and clearness, but not necessarily drawn to scale. For example, some elements in the drawings may be enlarged relative to others, so as to facilitate the understanding on the embodiments of the present invention.

DETAILED DESCRIPTION OF THE EMBODIMENTS

Exemplary embodiments of the present invention will be described in detail below in combination with the accompanying drawings. For the sake of simplicity and clearness, all features of the practical embodiments are not described in the specification. However, it should be understood that many embodiment-specific decisions must be made in the process of developing any such practical embodiment to achieve specific goals of developers, for example, conforming to limiting conditions related to the system and services, and these limiting conditions may vary between different embodiments. Moreover, it should also be understood that the development which may be very complicated and time-consuming is however only a routine task for those skilled in the art.

It should be further noted herein that, in order to avoid that the present invention is obscured due to unnecessary details, only device structures and/or processing steps closely related to the solutions according to the present invention are described in the accompanying drawings and the description, and the expression and the description of components and processing having little relation to the present invention and known by those of ordinary skill in the art are omitted.

In order to make the objects, technical solutions and advantages of the embodiments of the present invention clearer, the technical solutions in the embodiments of the present invention will be clearly and completely described below in combination with the accompanying drawings in the present invention. Obviously, the described embodiments are part of but not all of the embodiments of the present invention. Elements and features described in one drawing or one embodiment of the present invention may be combined with elements and features shown in one or more other drawings or embodiments. It should be noted that, for the purpose of clearness, the expression and the description of components and processing having little relation to the present invention and known by those of ordinary skill in the art are omitted in the drawings and the description. Based on the embodiments of the present invention, all other embodiments obtained by those of ordinary skill in the art without creative efforts shall fall into the protection scope of the present invention.

Embodiment I

Refer to FIG. 1, which is a structural block diagram of a multi-wheel aeroplane braking system based on a self-energy-regenerative braking device provided by an embodiment in accordance with the disclosure. The multi-wheel aeroplane braking system based on a self-energy-regenerative braking device in this embodiment includes a controller 10, a plurality of hydraulic pumps 11, a self-energy-regenerative braking device assembly 12 and a plurality of braking actuators 13. Two hydraulic pumps 11 and two braking actuators 13 are included in this embodiment as an example.

The controller 10 is connected to the self-energy-regenerative braking device assembly 12, and is configured to send a braking instruction to the self-energy-regenerative braking device assembly 12. The hydraulic pumps 11 are respectively connected to the self-energy-regenerative braking device assembly 12, one aeroplane wheel 14 is correspondingly connected with one hydraulic pump 11, and the hydraulic pumps 11 are configured to feed high-pressure oil to the self-energy-regenerative braking device assembly 12 under the driving by the motion of the aeroplane wheels 14 connected thereto. It should be noted that the hydraulic pumps 11 can convert the rotating kinetic energy of the aeroplane wheels 14 into hydraulic energy and supply the hydraulic energy to the self-energy-regenerative braking device assembly 12. The hydraulic pumps 11 can establish a pressure locally through transmission mechanisms, and may also establish a pressure locally through auxiliary motors, and this embodiment is not limited thereto.

In a preferred embodiment of the present invention, the aeroplane braking system further includes transmission mechanisms connected with the hydraulic pumps 11 and the aeroplane wheels 14 respectively. In this embodiment, the hydraulic pumps 11 are connected to the self-energy-regenerative braking device assembly 12 via hydraulic pipelines, the aeroplane wheels 14 drive the transmission mechanisms during movement thereof, and the hydraulic pumps 11 establish a pressure via the transmission mechanisms and feed the oil-pressure oil to the self-energy-regenerative braking device assembly 12 via the hydraulic pipelines.

In another preferred embodiment of the present invention, the aeroplane braking system further includes auxiliary motors connected with the hydraulic pumps. In this embodiment, the hydraulic pumps 11 are connected to the self-energy-regenerative braking device assembly 12 via hydraulic pipelines, and the hydraulic pumps 11 establish a pressure via the auxiliary motors and feed the oil-pressure oil to the self-energy-regenerative braking device assembly 12 via the hydraulic pipelines. It should be noted that, when the aeroplane abnormally lands and brakes or the recovered kinetic energy of the aeroplane wheels is not sufficient for use by the self-energy-regenerative braking device assembly 12, the auxiliary motors supplement energy for the self-energy-regenerative braking device assembly 12, so that the aeroplane can brake smoothly.

Figure 2:
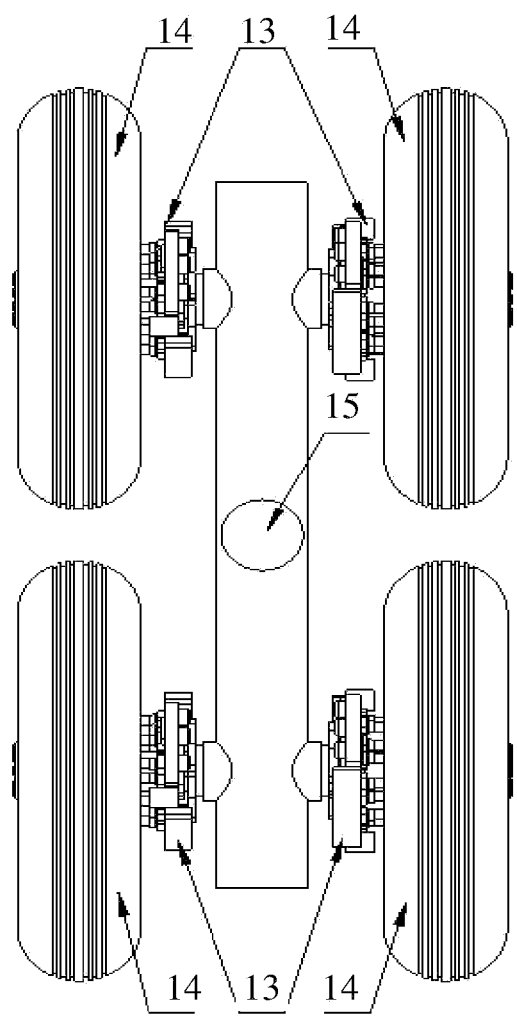
FIG. 2 is a schematic structure of a structural layout of hydraulic actuators of the multi-wheel aeroplane braking system provided by an embodiment in accordance with the disclosure.

The self-energy-regenerative braking device assembly 12 is connected with the controller 10, the hydraulic pumps 11 and the braking actuators 13 respectively, and is configured to receive the high-pressure oil fed by at least part of the hydraulic pumps 11 and the braking instruction sent by the controller 10 and feeding the high-pressure oil to each of the braking actuators 13 according to the braking instruction. It should be noted that, FIG. 2 is a schematic structure of a structural layout of hydraulic actuators of the multi-wheel aeroplane braking system. The aeroplane includes aeroplane wheels 14, braking actuators 13 and an undercarriage spindle 15. As to a four-wheel undercarriage aeroplane, namely four aeroplane wheels 14 are distributed on the same undercarriage, each aeroplane wheel 14 is provided with a braking actuator 13, and each braking actuator 13 needs supply of high-pressure oil when braking.

The braking actuators 13 are respectively connected to the self-energy-regenerative braking device assembly 12 and the aeroplane wheels 14, one aeroplane wheel 14 corresponds to one braking actuator 13, and the braking actuators 13 are configured to receive the high-pressure oil fed by the self-energy-regenerative braking device assembly 12 and braking the aeroplane wheels 14. It should be noted that the braking actuators 13 can brake the aeroplane wheels 14 after receiving the oil-pressure oil fed by the self-energy-regenerative braking device assembly 12, thus braking the aeroplane.

In a preferred embodiment of the present invention, the controller 10 is further configured to receive a braking pressure and a wheel rotating speed sent by the aeroplane wheels 14, generating a braking instruction according to the braking pressure and the wheel rotating speed and sending the braking instruction to the self-energy-regenerative braking device assembly 12. It should be noted that the controller 10 can simultaneously send the braking instruction to each self-energy-regenerative braking device assembly, to perform closed-loop anti-skid braking in combination with the feedback of the wheel rotating speed and the braking pressure of the aeroplane wheels 14.

In still another preferred embodiment of the present invention, the self-energy-regenerative braking device assembly 12 includes a brake valve. The self-energy-regenerative braking device assembly in this embodiment is further configured to output a standard braking pressure via the brake valve, converting the high-pressure oil into standard pressure oil and feeding the standard pressure oil to the braking actuators 13.

In yet another preferred embodiment of the present invention, an M energy supply-driving N mode is adopted, and M is less than N. Each self-energy-regenerative braking device assembly receives high-pressure oil fed by M hydraulic pumps, and feeds the high-pressure oil to N braking actuators 13 respectively. It should be noted that the "M energy supply-driving N" mode means that for the self-energy-regenerative braking device assembly, "M energy supply" indicates that the self-energy-regenerative braking device assembly can simultaneously obtain energy from M wheels; and "-driving N" indicates that the self-energy-regenerative braking device assembly can simultaneously drive N braking actuators 13 to brake. It should be noted that the value ranges of M and N are related to the quantity of aeroplane wheels, for example, for a four-wheel aeroplane including four aeroplane wheels, the solution of M≥N may waste energy, so M should be smaller than N, that is, when N is 4, M may be 1, 2 or 3; when N is 3, M may be 1 or 2; and when N is 2, M may be 1.

Figure 3:
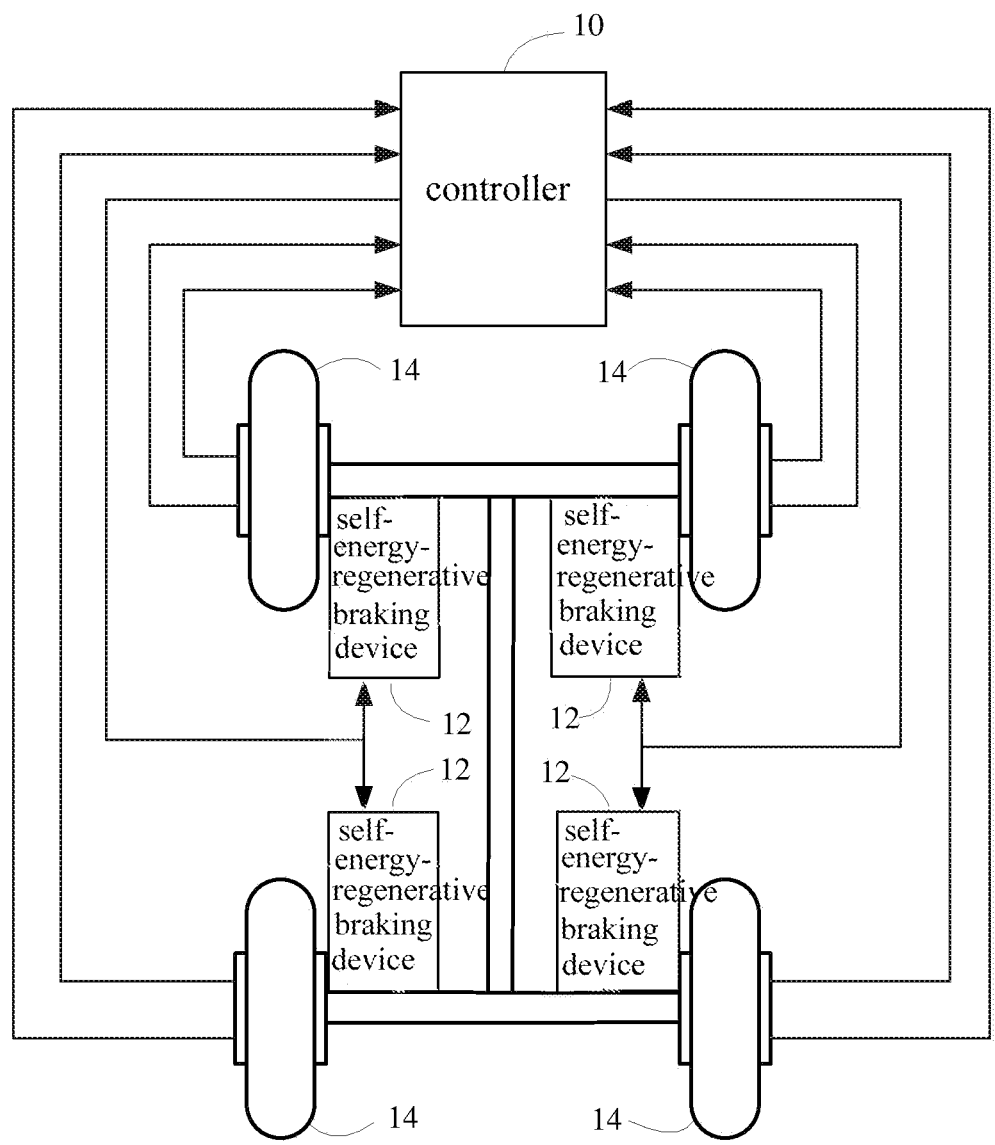
FIG. 3 is a schematic diagram of "1 energy supply-driving 1" structural configuration of a multi-wheel aeroplane self-energy-regenerative braking device provided by an embodiment in accordance with the disclosure.

As shown in FIG. 3, for a plurality of aeroplane wheels 14 on the same undercarriage, it can be seen that each wheel is provided with a self-energy-regenerative braking device assembly 12, namely a "1 energy supply-driving 1" mode. In FIG. 3, the system includes a controller 10, aeroplane wheels 14 and self-energy-regenerative braking device assemblies 12. That is, each aeroplane wheel 14 is provided with a self-energy-regenerative braking device assembly 12, each self-energy-regenerative braking device assembly 12 acquires energy from the corresponding aeroplane wheel 14 and supplies the energy to the corresponding braking actuator 13, the controller 10 simultaneously sends the braking instruction to each self-energy-regenerative braking device assembly 12, and closed-loop anti-skid braking is performed in combination with the feedback of the wheel rotating speed and the braking pressure of the aeroplane wheels 14.

However, the "1 energy supply-driving 1" mode may not be an optimal solution, because the energy obtained from one aeroplane wheel 14 is more than sufficient for one braking actuator 13, and then the obtained redundant energy is wasted. Thus, the "1 energy supply-driving 1" mode of the self-energy-regenerative braking device assembly may not be adopted, but structural configuration of the self-energy-regenerative braking device assembly can be performed on the overall aeroplane braking system to optimize energy management, so that the size, the weight and the reliability of the overall aeroplane braking system are optimized.

It should be noted that, for a four-wheel undercarriage aeroplane, theoretically, M in the "M energy supply-driving N" mode may be 1, 2, 3 or 4, N may be 1, 2, 3 or 4, and 16 structural configuration solutions of the self-energy-regenerative braking device assembly system may be obtained by permutation and combination. Since the "1 energy supply-driving 1" mode wastes energy, all the solutions of M≥N waste energy and are undesirable, then 10 solutions are excluded, and the remaining six solutions include a "1 energy supply-driving 2" mode, a "1 energy supply-driving 3" mode, a "1 energy supply-driving 4" mode, a "2 energy supply-driving 3" mode, a "2 energy supply-driving 4" mode and a "3 energy supply-driving 4" mode, and the optimized choice of the six solutions needs quantitative calculation of aeroplane parameters.

Of courses, if energy permits, the "1 energy supply-driving 4" mode is an optimal solution, because only one self-energy-regenerative braking device assembly is configured for four aeroplane wheels, and compared with the "1 energy supply-driving 1" mode, the quantity of the self-energy-regenerative braking device assembly is greatly reduced, the volume of the aeroplane braking system is reduced, the weight of the aeroplane is reduced, and the reliability and the safety of the aeroplane braking system are greatly improved.

Figure 4:
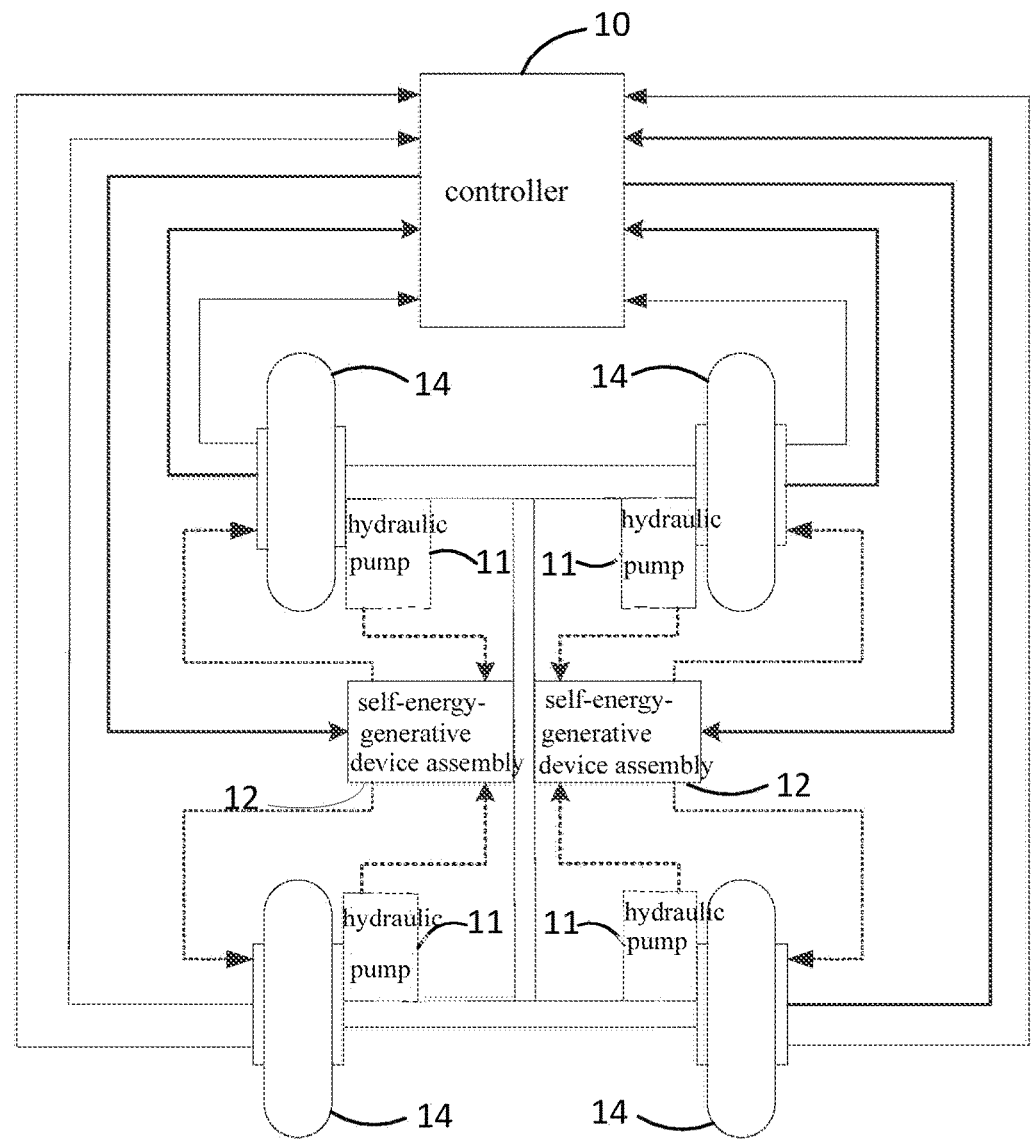
FIG. 4 is a schematic diagram of "2 energy supply-driving 2" structural configuration of a multi-wheel aeroplane self-energy-regenerative braking device provided by an embodiment in accordance with the disclosure.
Figure 5:
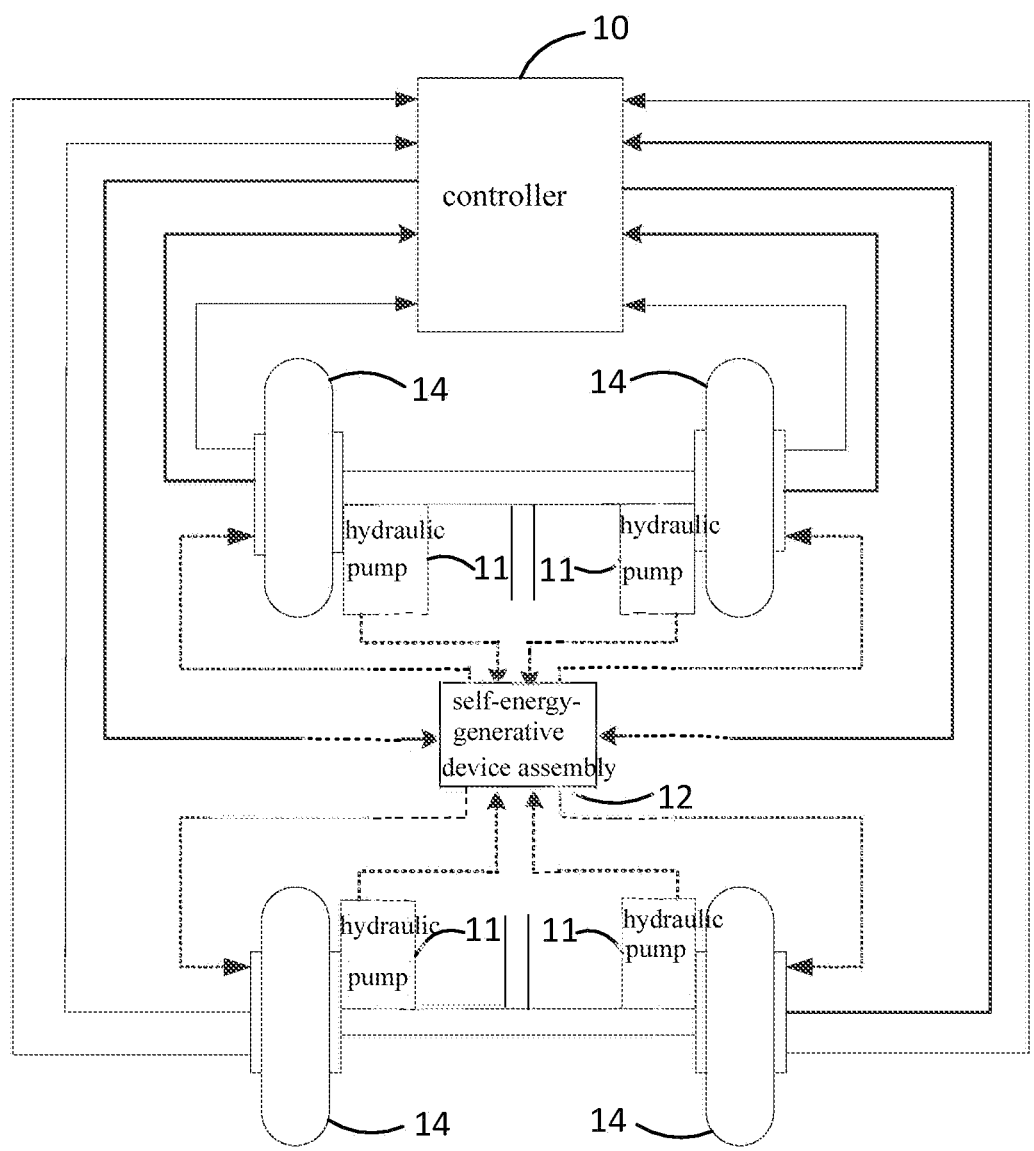
FIG. 5 is a schematic diagram of "4 energy supply-driving 4" structural configuration of a multi-wheel aeroplane self-energy-regenerative braking device provided by an embodiment in accordance with the disclosure.

A "2 energy supply-driving 2" mode is described below as an example. FIG. 4 shows a schematic diagram of "2 energy supply-driving 2" structural configuration of multi-wheel aeroplane self-energy-regenerative braking device. The aeroplane braking system includes a controller 10, aeroplane wheels 14, hydraulic pumps 11 and self-energy-regenerative braking device assemblies 12. It should be noted that the self-energy-regenerative braking device assembly refers to parts of the self-energy-regenerative braking device assembly except for transmission mechanisms, hydraulic pumps and auxiliary motors. In FIG. 4, solid lines represent electrical signal instruction lines, and dotted lines represent hydraulic pipelines. A transmission mechanism, a hydraulic pump and an auxiliary motor are configured nearby each aeroplane wheel 14, wherein the hydraulic pump establishes a pressure locally at the wheel via the transmission mechanism (or the auxiliary motor) and feeds high-pressure oil to the self-energy-regenerative braking device assembly via a hydraulic pipeline. When braking is needed, the self-energy-regenerative braking device assembly outputs a standard braking pressure via a brake valve, and the standard pressure oil is fed to the braking actuators 13 via the hydraulic pipeline for anti-skid braking. It could be seen that two self-energy-regenerative braking device assemblies are configured in the braking system shown in FIG. 4, each self-energy-regenerative braking device assembly can simultaneously acquire energy from two aeroplane wheels 14 and can simultaneously supply the energy to two aeroplane braking actuators 13, thus achieving the "2 energy supply-driving 2" mode. A "4 energy supply-driving 4" mode will be described below as an example. FIG. 5 shows a schematic diagram of "4 energy supply-driving 4" structural configuration of a multi-wheel aeroplane self-energy-regenerative braking device. The aeroplane braking system includes a controller 10, aeroplane wheels 14, hydraulic pumps 11 and a self-energy-regenerative braking device assembly 12. It should be noted that the self-energy-regenerative braking device assembly refers to parts of the self-energy-regenerative braking device except for transmission mechanisms, hydraulic pumps and auxiliary motors. In FIG. 5, solid lines represent electrical signal instruction lines, and dotted lines represent hydraulic pipelines. A transmission mechanism, a hydraulic pump and an auxiliary motor are configured nearby each aeroplane wheel, wherein the hydraulic pump establishes a pressure locally at the wheel via the transmission mechanism (or the auxiliary motor) and feeds high-pressure oil to the self-energy-regenerative braking device assembly via a hydraulic pipeline. When braking is needed, the self-energy-regenerative braking device assembly outputs a standard braking pressure via a brake valve, and the standard pressure oil is fed to the braking actuators 13 via the hydraulic pipeline for anti-skid braking. It could be seen that one self-energy-regenerative braking device assembly is configured in the braking system shown in FIG. 5, each device assembly can simultaneously acquire energy from four aeroplane wheels 14 and can simultaneously supply the energy to four aeroplane braking actuators 13, thus achieving the "4 energy supply-driving 4" mode.

The working ways of other modes are similar, and will not be redundantly described in this embodiment. For aeroplanes with different parameters, the optimal solution of the "M energy supply-driving N" mode is also different, and the optimal configuration mode can be obtained by quantitative calculation of specific parameters of the aeroplanes.

According to the multi-wheel aeroplane braking system based on a self-energy-regenerative braking device provided by the embodiment, the kinetic energy when the aeroplane wheels skates on the ground can be converted into hydraulic energy by the hydraulic pumps, to provide high-pressure oil for the braking actuators to achieve braking, so that the energy of the aeroplane engine is not relied on, the weight of the aeroplane is reduced and the reliability of the aeroplane braking system is improved.

Embodiment II

Figure 6:
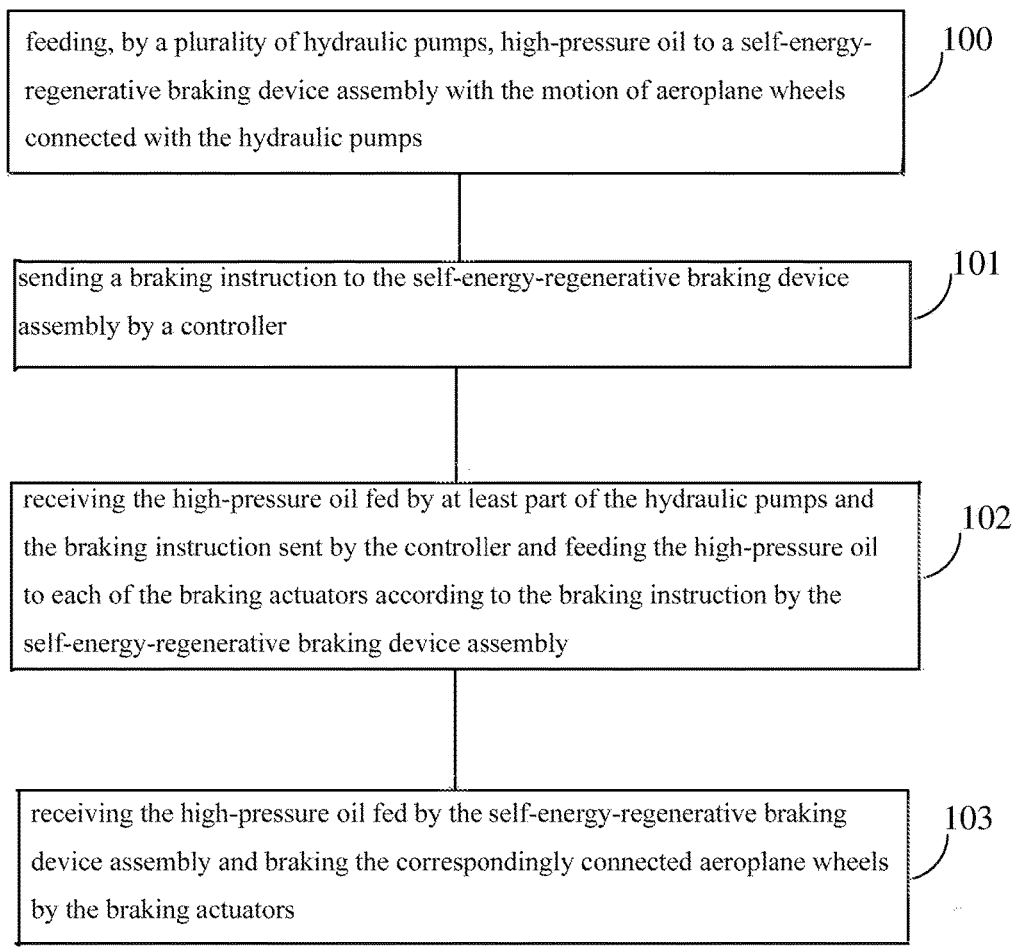
FIG. 6 is a flow diagram of a controlling method of a multi-wheel aeroplane braking system based on a self-energy-regenerative braking device provided by an embodiment in accordance with the disclosure.

Refer to FIG. 6, which is a flow diagram of a controlling method of a multi-wheel aeroplane braking system based on a self-energy-regenerative braking device provided by an embodiment in accordance with the disclosure. The controlling method in this embodiment specifically may include the following steps:

At step 100, high-pressure oil is fed by a plurality of hydraulic pumps to a self-energy-regenerative braking device assembly under the driving by the motion of aeroplane wheels connected with the hydraulic pumps. In one preferred embodiment of the present invention, step 100 of feeding high-pressure oil to the self-energy-regenerative braking device assembly by the hydraulic pumps may include: when the aeroplane wheels drive transmission mechanisms connected thereto during movement of the aeroplane wheels, establishing, by the hydraulic pumps, a pressure via the transmission mechanisms connected thereto and feeding the high-pressure oil to the self-energy-regenerative braking device assembly via hydraulic pipelines. In another preferred embodiment of the present invention, step 100 of feeding high-pressure oil to the self-energy-regenerative braking device assembly by the hydraulic pumps further includes: establishing by the hydraulic pumps, a pressure via auxiliary motors connected thereto and feed the high-pressure oil to the self-energy-regenerative braking device assembly via hydraulic pipelines.

At step 101, a braking instruction is sent by a controller to the self-energy-regenerative braking device assembly. In a preferred embodiment of the present invention, before sending a braking instruction to the self-energy-regenerative braking device assembly by the controller, the method further includes: the controller acquires the braking pressure and the wheel rotating speed of the aeroplane wheels via pressure sensors and rotating speed sensors connected to the aeroplane wheels respectively, and generates a braking instruction according to the braking pressure and the wheel rotating speed.

Step 102, high-pressure oil fed by at least part of the hydraulic pumps and the braking instruction sent by the controller is received by each self-energy-regenerative braking device assembly. Also at 102, the high-pressure oil is fed by each self-energy-regenerative braking device assembly to each of the braking actuators according to the braking instruction.

At step 103, the high-pressure oil fed by the self-energy-regenerative braking device assembly is received by the braking actuators, and the correspondingly connected aeroplane wheels are braked by the braking actuators.

This embodiment is a method embodiment corresponding to embodiment I. See relevant contents in embodiment I, which will not be redundantly described in this embodiment.

According to the controlling method of the multi-wheel aeroplane braking system based on a self-energy-regenerative braking device provided by the embodiment, the kinetic energy when the aeroplane wheels skates on the ground can be converted into hydraulic energy by the hydraulic pumps, to provide high-pressure oil for the braking actuators to achieve braking, so that the energy of the aeroplane engine is not relied on, the weight of the aeroplane is reduced and the reliability of the aeroplane braking system is improved.

In the above embodiments of the present invention, the serial numbers and/or the sequence of the embodiments merely facilitate description, but do not represent the performance of the embodiments. There is emphasis in the description of each embodiment, and for the part which is not described in detail in a certain embodiment, reference may be made to the relevant description of other embodiments.

Although the present invention and the advantages thereof are described in detail, it should be understood that various changes, substitutions and transformations may be made without departing from the spirit and the scope of the present invention defined by the appended claims.

Finally, it should be further noted that the relation terms such as first and second are merely configured to distinguish one entity or operation from the another entity or operation, but do not necessarily require or hint any practical relation or sequence between the entities or operations. Moreover, the term "comprise", "include" or any other variation means to cover non-exclusive inclusion, so that a process, method, article or device including a series of elements not only include these elements, but also include other elements not listed explicitly, or also include inherent elements of the process, method, article or device. In the absence of more limitations, the elements defined by the statement "include one . . . " do not exclude additional same elements in the process, method, article or device including the elements.

Although the embodiments of the present invention are described in detail above in combination with the accompanying drawings, it should be understood that the embodiments described above are merely configured to illustrate rather than limiting the present invention. Various modifications and alterations may be made to the above embodiments without departing from the spirit and the scope of the present invention. Accordingly, the scope of the present invention is only defined by the appended claims and equivalent contents thereof.

The invention claimed is:

1. A multi-wheel aeroplane braking system based on a self-energy-regenerative braking device, the multi-wheel aeroplane braking system comprising:
   a plurality of pressure sensors and a plurality of rotating speed sensors, each pressure sensor and each rotating speed sensor arranged in a respective aeroplane wheel of a plurality of aeroplane wheels to obtain a braking pressure of the aeroplane wheel and a wheel rotating speed of the aeroplane wheel, respectively;
   a controller connected to the self-energy-regenerative braking device assembly, the plurality of pressure sensors, and the plurality of rotating speed sensors, to generate a braking instruction according to the braking pressures and the wheel rotating speeds, and to send the braking instruction to the self-energy-regenerative braking device assembly;
   a plurality of hydraulic pumps, each connected to the self-energy-regenerative braking device assembly and a correspondingly connected aeroplane wheel of the plurality of aeroplane wheels, to feed high-pressure oil to the self-energy-regenerative braking device assembly under the conversion into hydraulic energy from kinetic energy by transmission mechanisms, wherein the conversion is brought about by the motion of the aeroplane wheels when the aeroplane wheels skate on the ground; and
   a plurality of braking actuators, each connected to the self-energy-regenerative braking device assembly and a correspondingly connected aeroplane wheel of the plurality of aeroplane wheels,
   to receive the high-pressure oil fed by the self-energy-regenerative braking device assembly according to the braking instruction, and to brake the correspondingly connected aeroplane wheel.

2. The multi-wheel aeroplane braking system based on the self-energy-regenerative braking device of claim 1, further comprising a plurality of transmission mechanisms, wherein
   each transmission mechanism is connected with a respective one of the hydraulic pumps and a respective one of the aeroplane wheels;
   the hydraulic pumps are connected to the self-energy-regenerative braking device assembly via hydraulic pipelines, the aeroplane wheels are configured to drive the transmission mechanisms during movement thereof, and the hydraulic pumps are configured to establish a pressure via the transmission mechanisms connected thereto and feed the oil-pressure oil to the self-energy-regenerative braking device assembly via the hydraulic pipelines.

3. The multi-wheel aeroplane braking system based on the self-energy-regenerative braking device of claim 2, further comprising:
   a plurality of auxiliary motors, each connected with a respective one of the hydraulic pumps,
   wherein the hydraulic pumps are configured to establish the pressure via the auxiliary motors connected thereto.

4. The multi-wheel aeroplane braking system based on the self-energy-regenerative braking device of claim 1, wherein:
   the self-energy-regenerative braking device assembly comprises a brake valve; and
   the self-energy-regenerative braking device assembly is further configured to output a standard braking pressure via the brake valve, to convert the high-pressure oil fed by at least part of the hydraulic pumps into standard pressure oil and to feed the standard pressure oil to each of the braking actuators.

5. The multi-wheel aeroplane braking system based on the self-energy-regenerative braking device of claim 1, wherein:
   the self-energy-regenerative braking device assembly is one of a plurality of self-energy-regenerative braking device assemblies; and
   each self-energy-regenerative braking device assembly is configured to receive high-pressure oil fed by M of the hydraulic pumps respectively, and to feed the high-pressure oil to N of the braking actuators, respectively, according to an M energy supply-driving N mode, wherein M is less than N, and M and N are positive integers.

6. A controlling method of multi-wheel aeroplane braking using a self-energy-regenerative braking device, the method comprising:
   receiving high-pressure oil by a self-energy-regenerative braking device assembly from a plurality of hydraulic pumps under conversion into hydraulic energy from kinetic energy by transmission mechanisms, wherein the conversion is brought about by motion of a plurality of aeroplane wheels connected with the hydraulic pumps when the aeroplane wheels skate on the ground;
   receiving a braking instruction by the self-energy-regenerative braking device assembly from a controller;
   feeding, by the self-energy-regenerative braking device assembly, the high-pressure oil to each of a plurality of braking actuators according to the braking instruction, each of the plurality of braking actuators connected with a corresponding one of the plurality of aeroplane wheels; and
   braking the correspondingly connected aeroplane wheels by the braking actuators responsive to receiving the high-pressure oil fed by the self-energy-regenerative braking device assembly.

7. The controlling method of claim 6, wherein:
   the hydraulic pumps are configured to establish a pressure via the transmission mechanisms connected thereto in response to movement of the aeroplane wheels connected to the transmission mechanisms, and to feed the high-pressure oil to the self-energy-regenerative braking device assembly via hydraulic pipelines in response to the established pressure.

8. The controlling method of claim 7, wherein:
   the hydraulic pumps are configured to establish the pressure via auxiliary motors connected thereto.

9. The controlling method of claim 6, wherein the method further comprises, prior to receiving the braking instruction:
   acquiring, by the controller, braking pressures and wheel rotating speeds of the aeroplane wheels via pressure sensors and rotating speed sensors connected to the aeroplane wheels, respectively; and
   generating the braking instruction according to the braking pressure and the wheel rotating speed.

10. The controlling method of claim 6, wherein:
    the self-energy-regenerative braking device assembly is one of a plurality of self-energy-regenerative braking device assemblies;

receiving the high-pressure oil comprises receiving, by each self-energy-regenerative braking device assembly, the high-pressure oil fed by M of the hydraulic pumps respectively; and feeding the high-pressure oil comprises feeding the high-pressure oil to N of the braking actuators, respectively, according to an M energy supply-driving N mode, wherein M is less than N, and M and N are positive integers.

* * * * *